US012715374B2

(12) United States Patent
Yamanouchi et al.

(10) Patent No.: US 12,715,374 B2
(45) Date of Patent: Aug. 25, 2026

(54) WIRE HARNESS

(71) Applicants: SUMITOMO WIRING SYSTEMS, LTD., Yokkaichi (JP); HONDA MOTOR CO., LTD., Tokyo (JP)

(72) Inventors: Hiroki Yamanouchi, Yokkaichi (JP); Takuji Iwama, Yokkaichi (JP); Masataka Ohashi, Tokyo (JP); Takeshi Oda, Tokyo (JP); Kotaro Tagami, Tokyo (JP)

(73) Assignees: SUMITOMO WIRING SYSTEMS, LTD., Yokkaichi (JP); HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 18/333,551

(22) Filed: Jun. 13, 2023

(65) Prior Publication Data

US 2023/0415674 A1 Dec. 28, 2023

(30) Foreign Application Priority Data

Jun. 22, 2022 (JP) ................................ 2022-100388

(51) Int. Cl.
*B60R 16/02* (2006.01)
*F16L 3/23* (2006.01)
*H02G 15/113* (2006.01)

(52) U.S. Cl.
CPC ............ *B60R 16/0215* (2013.01); *F16L 3/23* (2013.01); *H02G 15/113* (2013.01)

(58) Field of Classification Search
CPC ..... H02G 15/113; H01R 4/70; B60R 16/0215
USPC .......................................................... 174/92
See application file for complete search history.

(56) References Cited

U.S. PATENT DOCUMENTS

| | | | | |
|---|---|---|---|---|
| 3,519,731 | A * | 7/1970 | Torralva | H01R 24/28 174/92 |
| 4,810,829 | A * | 3/1989 | Rutenbeck | H02G 15/10 174/91 |
| 4,972,167 | A * | 11/1990 | Fujioka | H01F 27/33 336/212 |
| 5,217,387 | A * | 6/1993 | Hull | H01R 13/6392 439/367 |
| 5,942,964 | A * | 8/1999 | Takeuchi | H05K 9/0066 174/92 |
| 11,901,670 | B2 * | 2/2024 | Pearman | F16L 21/06 |
| 2015/0041175 | A1 | 2/2015 | Nakai et al. | |
| 2017/0076841 | A1 | 3/2017 | Nakai et al. | |
| 2018/0233893 | A1 | 8/2018 | Adachi et al. | |
| 2023/0291186 | A1 * | 9/2023 | Tsukimori | H02G 3/0481 |

FOREIGN PATENT DOCUMENTS

| | | |
|---|---|---|
| JP | 2018121465 A | 8/2018 |
| JP | 2018133837 A | 8/2018 |

* cited by examiner

*Primary Examiner* — Paresh Paghadal

(57) ABSTRACT

To provide a wire harness that restricts rotation of a wire in a holder, a wire harness includes a tubular member, a wire member extending through the tubular member, and a tubular holder holding the wire member in the tubular member. The holder includes a first segment and a second segment, which are separated by a separation plane extending in a longitudinal direction of the holder. The first segment includes a holding portion that holds the wire member in the holder. Also, the second segment includes a holding portion that holds the wire member in the holder.

4 Claims, 7 Drawing Sheets

10
24 (20)
24 (20)
52A (52)
52B (52)
56
55
30
50
60A
61A
60B
61B
84
33
81
82
83
56
55
51B (51)
31
51A (51)
21 (20)
21 (20)

WIRE HARNESS

BACKGROUND

1. Field

The following description relates to a wire harness.

2. Description of Related Art

A conventional wire harness used in a vehicle such as a hybrid vehicle or an electric vehicle includes a wire and a metal shield pipe through which the wire extends. An end of the wire is drawn out from an end of the shield pipe and then connected to an electric device through a desired route. Japanese Laid-Open Patent Publication No. 2015-35915 discloses an example of this type of wire harness that includes a resin holder attached to an axial end of the shield pipe. The resin holder is attached to the inside of the shield pipe. This hampers contact of the wire, which extends through the inside of the shield pipe, with an edge of the end of the shield pipe, thereby limiting damage to an insulation covering of the wire.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In the conventional wire harness, the inner circumferential surface of the holder has a true-circular cross section. Thus, the holder is likely to be separated from the wire by a large gap. This allows the wire to easily rotate in the holder. A jig for restraining the wire may be used to restrict rotation of the wire. However, the jig needs to be adjusted in accordance with the wire.

It is an objective of the present disclosure to provide a wire harness that restricts rotation of a wire in a holder.

A wire harness according to the present disclosure includes a tubular member, a wire member inserted through the tubular member, and a tubular holder holding the wire member in the tubular member. The holder includes a first segment and a second segment that are separated by a separation plane that extends in a longitudinal direction of the holder. Each of the first segment and the second segment includes a holding portion configured to hold the wire member disposed in the holder.

The wire harness according to the present disclosure is effective in restricting rotation of a wire in the holder.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
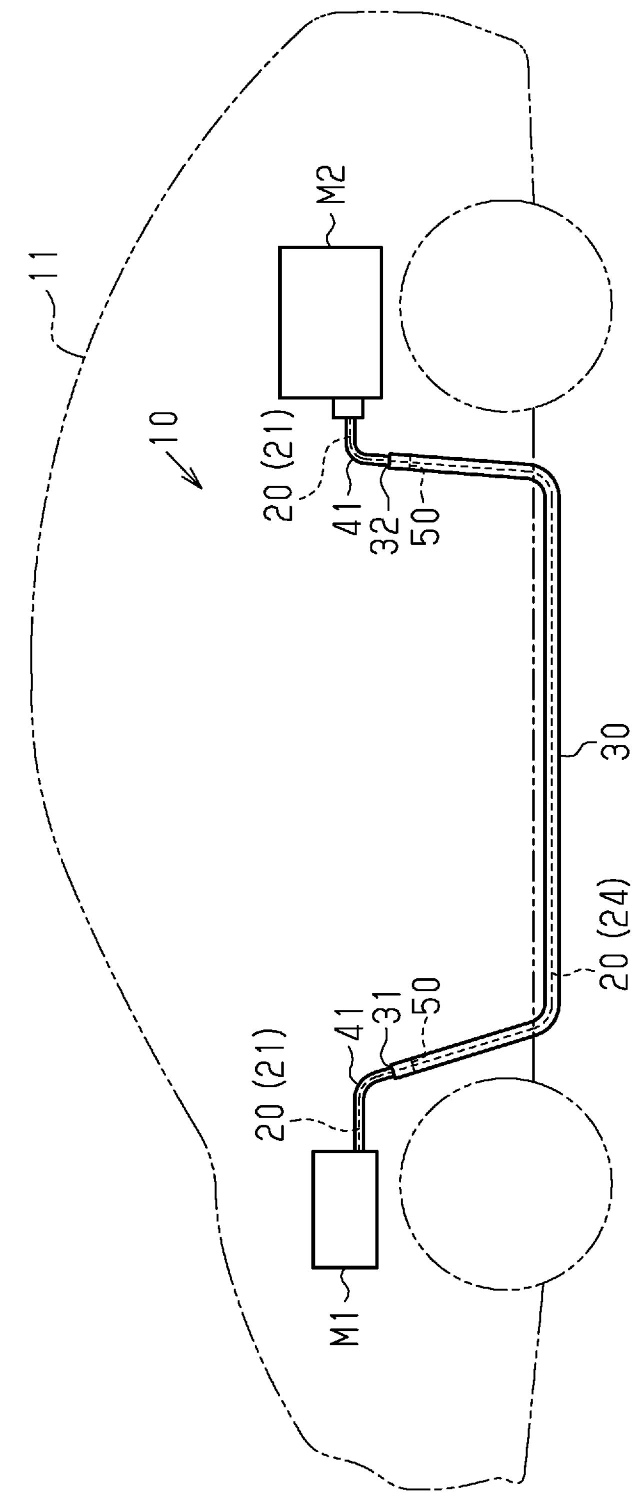
FIG. 1 is a schematic diagram of a wire harness.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

DESCRIPTION OF EMBODIMENTS OF PRESENT DISCLOSURE

The embodiments of the present disclosure will now be described.

In some embodiments of the present disclosure, a wire harness includes a tubular member, a wire member inserted through the tubular member, and a tubular holder holding the wire member in the tubular member. The holder includes a first segment and a second segment that are separated by a separation plane that extends in a longitudinal direction of the holder. Each of the first segment and the second segment includes a holding portion configured to hold the wire member disposed in the holder.

With this structure, the wire member located in the holder is sandwiched and held by the holding portions disposed on each of the first segment and the second segment. This restricts rotation of the wire member in the holder. In addition, a jig for bundling wire members is not necessary. This simplifies the structure of the wire harness. Furthermore, as compared to a case in which the jig for bundling the wire members is adjusted, the holder readily deals with wire members that have different cross-sectional shapes. Thus, the holder has a high versatility.

In some embodiments, each of the first segment and the second segment includes two ends in the longitudinal direction of the holder, and in each of the first segment and the second segment, the holding portion is disposed on each of the two ends.

With this structure, rotation of the wire member is restricted at the two ends in the longitudinal direction of the holder.

In some embodiments, the holder is cylindrical. Each of the first segment and the second segment includes a semi-cylindrical body and the holding portion projecting from an inner surface of the semi-cylindrical body.

With this structure, the cylindrical holder includes the first segment and the second segment. Thus, the wire member is readily covered by the holder.

In some embodiments, the wire member is one of wire members. The wire members are inserted through the holder. In the first segment and the second segment, the holding portions are disposed to sandwich the wire members in a direction orthogonal to a direction in which the wire members are arranged next to one another.

This structure restricts rotation of each of the wire members.

In some embodiments, as viewed in the longitudinal direction of the holder, the holding portion is V-shaped.

In some embodiments, the wire member includes a first wire, a second wire, and a joint portion joining the first wire and the second wire. The joint portion is disposed in the holder.

With this structure, the holder stably holds the first wire, the second wire, and the joint portion of the wire member. This appropriately restricts movement of the joint portion in the holder. Thus, the joined state of the first wire and the second wire is appropriately maintained.

Detailed Description of Embodiments of Present Disclosure

Specific examples of a wire harness according to the present disclosure will be described below with reference to the drawings. In the drawings, components may be partially exaggerated or simplified to facilitate understanding. The dimensional ratio of the components may differ between the drawings. In this specification, "orthogonal" is not limited to being exactly orthogonal and includes being generally orthogonal within the scope in which the operation and advantages of the embodiments are obtained. The present disclosure is not limited to those exemplified and is shown by the scope of the claims. It is intended to include all modifications within the meaning and range equivalent to the scope of the claims.

An embodiment of a wire harness will now be described with reference to FIGS. 1 to 6.

Wire Harness 10

As shown in FIG. 1, the wire harness 10 electrically connects electric devices M1 and M2. Alternatively, the wire harness 10 may be configured to connect three or more electric devices.

In an example, the wire harness 10 is mounted on a vehicle 11 such as a hybrid vehicle, an electric vehicle, or the like. The wire harness 10 includes one or more (in the present embodiment, two) wire members 20 that electrically connect the electric device M1 and the electric device M2. In an example, the wire harness 10 includes a tubular member 30 and tubular exterior members 41. The wire members 20 extend through the tubular member 30. The tubular exterior members 41 surround the wire members 20 extending out of the tubular member 30. In an example, the wire harness 10 includes holders 50 arranged on ends 31 and 32 of the tubular member 30 in the longitudinal direction (axial direction). The tubular member 30 and the exterior members 41 protect the wire members 20, accommodated in the tubular member 30 and the exterior members 41, from flying objects and waterdrops. In an example, the wire harness 10 has a passage that is bent in two dimensions or three dimensions.

Wire Member 20

In an example, the wire harness 10 is laid out so that a portion of the wire harness 10 in the longitudinal direction extends under the floor of the vehicle 11 from the electric device M1 to the electric device M2. One end of each wire member 20 is connected to the electric device M1. The other end of the wire member 20 is connected to the electric device M2. In an example, the electric device M1 is an inverter arranged toward the front of the vehicle 11, and the electric device M2 is a high-voltage battery arranged toward the rear of the vehicle 11 from the electric device M1. In an example, the inverter is connected to a wheel driving motor that is used as a power source for the vehicle to travel. The inverter generates an alternating current power from a direct current power of the high-voltage battery and supplies the alternating current power to the motor. The high-voltage battery is configured to supply a voltage of, for example, 100 V or higher.

Figure 3:
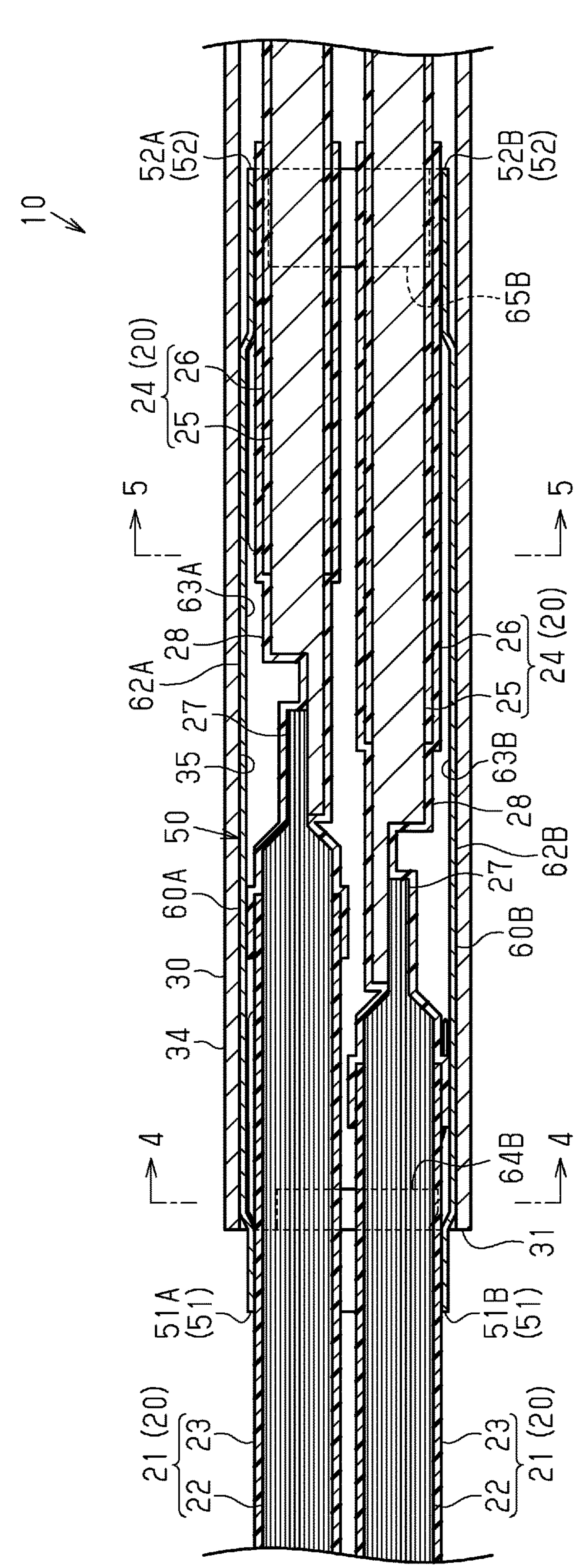
FIG. 3 is a schematic cross-sectional view of the wire harness shown in FIG. 2.

As shown in FIG. 3, each wire member 20 includes a first wire 21 and a second wire 24 electrically connected to the first wire 21. In an example, the first wire 21 is a flexible wire, and the second wire 24 is a rigid wire. In the present embodiment, the wire member 20 is obtained by electrically connecting the first wire 21 and the second wire 24, which differ in type, in the longitudinal direction of the wire member 20. Alternatively, the wire member 20 may be obtained by electrically connecting a first wire 21 and a second wire 24 that are the same type. The flexible wire is more flexible than the rigid wire. The flexible wire has a higher bendability than the rigid wire. In an example, the rigid wire has a greater flexural rigidity than the flexible wire. In an example, the rigid wire is rigid enough to retain a shape conforming to the laid out passage of the wire member 20. In an example, when mounted on the vehicle 11 (refer to FIG. 1), the rigid wire is rigid enough to maintain a straight or bent state of the rigid wire when the vehicle 11, for example, vibrates. In an example, when the rigid wire is laid out in a curved passage, the rigid wire is bent and retains the bent shape.

As shown in FIGS. 1 and 3, the wire member 20 includes a joint portion 27 that joins each first wire 21 and the second wire 24 and a covering member 28 that covers the circumference of the joint portion 27. The first wires 21 are connected to two opposite ends of the second wire 24 in the longitudinal direction. In the present embodiment, the wire member 20 includes a longitudinal intermediate portion formed of the second wire 24, and the wire member 20 includes two longitudinal ends formed of the first wires 21. The first wires 21 and the second wire 24 are, for example, high-voltage wires that may be used with high voltage and high current. In an example, each of the first wires 21 and the second wire 24 may be a shielded wire having an electromagnetic shielding structure and an unshielded wire that does not have an electromagnetic shielding structure. In the present embodiment, the first wires 21 and the second wire 24 are unshielded wires.

First Wire 21

As shown in FIG. 3, the first wire 21 includes a core wire 22 formed of metal strands and an insulation covering 23 that covers the circumference of the core wire 22. The core wire 22 may be, for example, a stranded wire obtained by twisting a plurality of metal strands or a braided member obtained by braiding a plurality of metal strands into the form of a tube. In the present embodiment, the core wire 22 is a stranded wire. The material of the core wire 22 may be, for example, copper-based or aluminum-based metal.

When the core wire 22 is cut along a plane orthogonal to the longitudinal direction, the cross section of the core wire 22, that is, the transverse cross section of the core wire 22, may have any shape. The transverse cross-sectional shape of the core wire 22 may be, for example, a circle, a semicircle, a polygon, a square, or an oblong. In the present embodiment, the transverse cross-sectional shape of the core wire 22 is a circle.

In an example, the insulation covering 23 entirely covers the circumference of the core wire 22 in the circumferential direction. In an example, the insulation covering 23 is formed from an insulation material such as a synthetic resin. In an example, the material of the insulation covering 23 may be a polyolefin-based resin such as cross-linked polyethylene or a cross-linked polypropylene. In an example, the insulation covering 23 may be formed by performing extrusion (extrusion covering) on the core wire 22.

Second Wire 24

In an example, the second wire 24 includes a single core wire 25 formed of a single conductor and an insulation covering 26 covering the circumference of the single core wire 25. The single core wire 25 may be, for example, a rod-shaped conductor formed of a single metal rod having a solid inner structure or a tubular conductor having a hollow inner structure. In the present embodiment, the single core wire 25 is a rod-shaped conductor. The material of the single core wire 25 may be, for example, copper-based or aluminum-based metal. In an example, the material of the single core wire 25 may be the same type as the material of the core wire 22 or may differ from the material of the core wire 22. The single core wire 25 is formed through, for example, extrusion. The single core wire 25 may have any transverse cross-sectional shape. In the present embodiment, the transverse cross-sectional shape of the single core wire 25 is a circle.

In an example, the insulation covering 26 entirely covers the circumference of the single core wire 25 in the circumferential direction. In an example, the insulation covering 26 is formed from an insulation material such as a synthetic resin. The material of the insulation covering 26 may be, for example, a polyolefin-based resin such as cross-linked polyethylene or a cross-linked polypropylene. In an example, the insulation covering 26 may be formed by performing extrusion on the single core wire 25. The insulation covering 26 may be, for example, formed of a heat-shrink tube or a rubber tube.

Joint Portion 27

The joint portion 27 joins the core wire 22 and the single core wire 25. More specifically, the insulation covering 23 is removed from a longitudinal end of the first wire 21 by a fixed length from the terminal of the first wire 21 to expose the end of the core wire 22. Also, the insulation covering 26 is removed from a longitudinal end of the second wire 24 by a fixed length from the terminal of the second wire 24 to expose the end of the single core wire 25. In the joint portion 27, the end of the core wire 22 exposed from the insulation covering 23 is joined to the end of the single core wire 25 exposed from the insulation covering 26. In an example, in the joint portion 27, the core wire 22 and the single core wire 25 are disposed one on the other in a radial direction, that is, a direction intersecting the longitudinal direction of the core wire 22 and the single core wire 25, and joined to each other. The process of joining the core wire 22 and the single core wire 25 is not particularly limited. In an example, the core wire 22 and the single core wire 25 may be joined by ultrasonic welding or laser beam welding.

Covering Member 28

The covering member 28 covers the circumference of the joint portion 27. In an example, the covering member 28 is elongated and tubular. In an example, the covering member 28 covers the core wire 22, exposed from the insulation covering 23, and the single core wire 25, exposed from the insulation covering 26. In an example, the covering member 28 extends over an end of the insulation covering 23 and an end of the insulation covering 26. In an example, one end of the covering member 28 covers the outer circumferential surface of the end of the insulation covering 23, and the other end of the covering member 28 covers the outer circumferential surface of the end of the insulation covering 26. The covering member 28 entirely surrounds the circumference of the first wire 21 and the circumference of the second wire 24 in the circumferential direction. In an example, the covering member 28 maintains the electrical insulation of the joint portion 27, and the core wire 22 and the single core wire 25, which are exposed from the insulation coverings 23 and 26. In an example, the covering member 28 also protects the joint portion 27, and the core wire 22 and the single core wire 25, which are exposed from the insulation coverings 23 and 26.

The covering member 28 may be, for example, a shrinkable tube, a rubber tube, a resin mold, a hot melt adhesive, or a tape member. In the present embodiment, the covering member 28 is a heat-shrink tube. In an example, the material of the covering member 28 may be a synthetic resin, the main component of which is a polyolefin-based resin such as cross-linked polyethylene or a cross-linked polypropylene.

In an example, the second wire 24 is disposed in the tubular member 30. In an example, the entire length of the second wire 24 is disposed in the tubular member 30 in the longitudinal direction of the second wire 24. In an example, the joint portion 27 is disposed in the tubular member 30. In an example, a longitudinal end of the first wire 21 is disposed in the tubular member 30. The first wire 21 is drawn out of the tubular member 30 from the end 31 of the tubular member 30. Although not shown, in the same manner, at the end 32 (refer to FIG. 1) of the tubular member 30, the joint portion 27, which joins the longitudinal end of the first wire 21 and the longitudinal end of the second wire 24, is disposed in the tubular member 30. Also, the first wire 21 is drawn out of the tubular member 30 from the end 32 of the tubular member 30.

Tubular Member 30

In the present embodiment, the tubular member 30 has the form of an elongated cylindrical tube. In an example, the tubular member 30 is disposed in a longitudinal intermediate portion of the wire harness 10. In an example, a longitudinal intermediate portion of the wire member 20 is accommodated in the tubular member 30. In an example, the tubular member 30 entirely surrounds the circumference of the wire member 20 in the circumferential direction. The tubular member 30 may be, for example, a metal pipe, a resin pipe, a corrugated resin tube, a waterproof rubber cover, or a combination of these. The material of the metal pipe may be, for example, an aluminum-based or copper-based metal material. The material of the resin pipe and the corrugated tube may be, for example, a conductive resin material or a non-conductive resin material. The resin material may be, for example, a synthetic resin such as polyolefin, polyamide, polyester, or an acrylonitrile butadiene styrene (ABS) resin. In the present embodiment, the tubular member 30 is a metal pipe.

Figure 2:
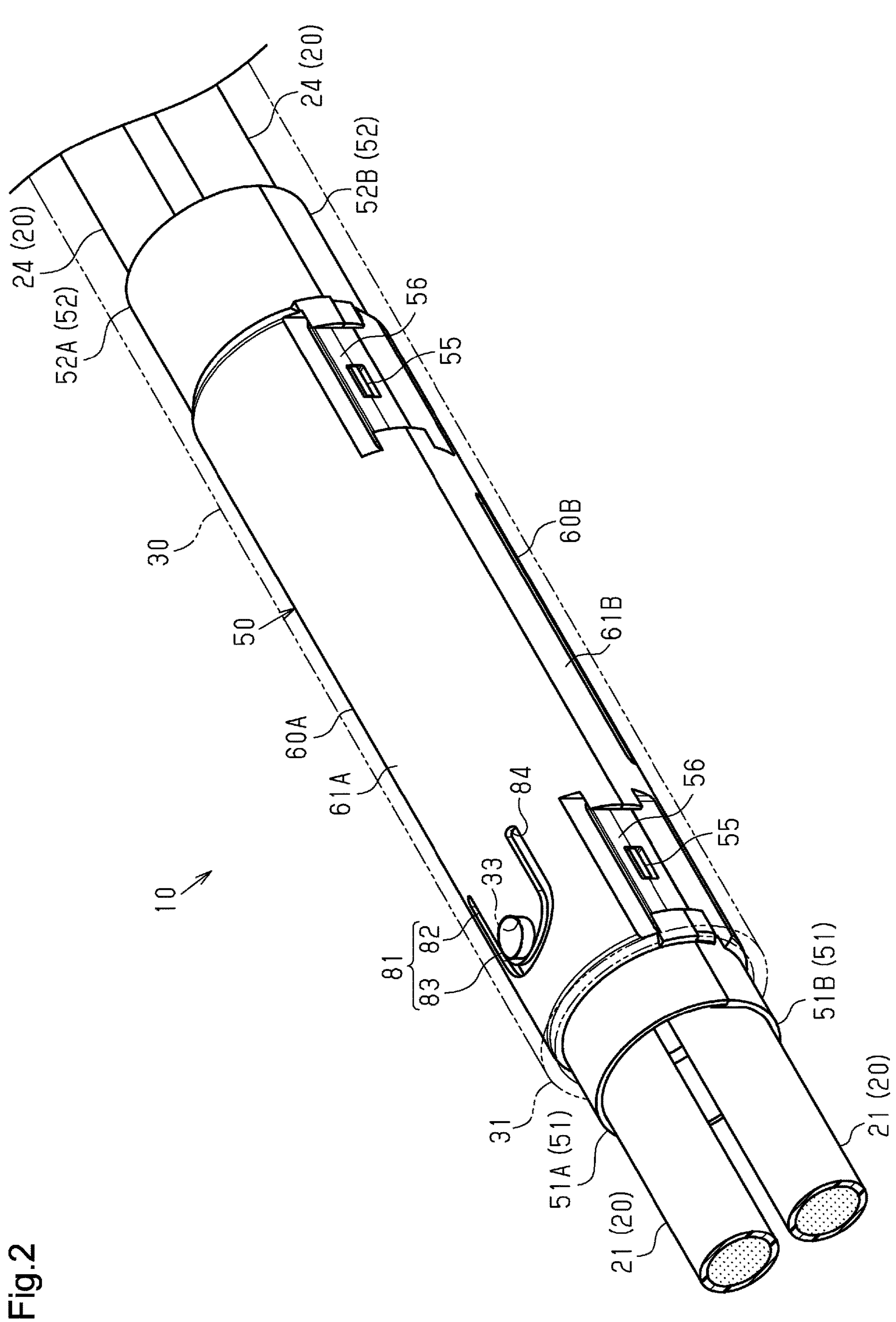
FIG. 2 is a schematic perspective view of the wire harness shown in FIG. 1.
Figure 4:
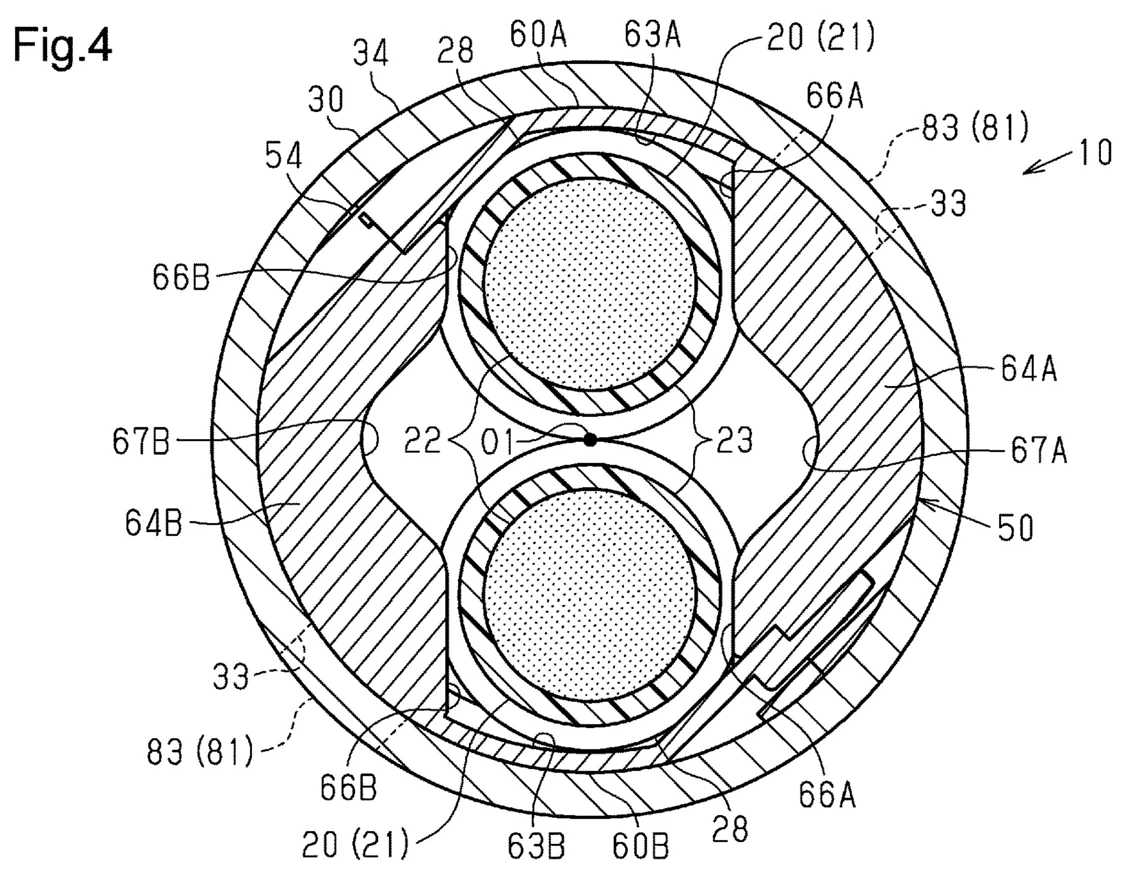
FIG. 4 is a cross-sectional view taken along line 4-4 in FIG. 3.

As shown in FIGS. 2 and 4, the tubular member 30 includes a through hole 33. The through hole 33 extends through the tubular member 30 from an outer surface 34 to an inner surface 35 of the tubular member 30. In the present embodiment of the tubular member 30, the ends 31 and 32 each include two through holes 33. The two through holes 33 are located in different positions in the circumferential direction of the tubular member 30. In the present embodiment, the through holes 33 are separated at an interval of 180 degrees in the circumferential direction of the tubular member 30.

Exterior Member 41

As shown in FIG. 1, the exterior members 41 are elongated and tubular. In an example, the exterior members 41 are disposed on two longitudinal ends of the wire harness 10. In an example, a longitudinal end of the wire member 20, that is, an end of the wire member 20 drawn out from the tubular member 30, is accommodated in the exterior member 41. In an example, the exterior member 41 entirely surrounds the circumference of the wire member 20 in the circumferential direction. In an example, the exterior member 41 entirely surrounds the circumference of the first wire 21 in the circumferential direction along the longitudinal direction of the wire members 20. The exterior member 41 may be, for example, a corrugated tube or a waterproof cover.

Holder 50

When the holder 50 is inserted into the tubular member 30, the holder 50 is coupled to the ends 31 and 32 of the tubular member 30. The holder 50 holds a plurality of wire members 20. More specifically, the holders 50 holds the wire members 20 that are inserted through the tubular member 30. In an example, the holder 50 is formed from a synthetic resin. The material of the holder 50 may be, for example, a synthetic resin such as polyolefin, polyamide, polyester, or an acrylonitrile butadiene styrene (ABS) resin. The holder 50 sets layout positions (arrangement) of the wire members 20 and maintains the layout positions. The holder 50 sets the layout positions of the wire members 20 with respect to the tubular member 30 and maintains the layout positions. When the holder 50 is disposed in the tubular member 30, the holder 50 protects the wire members 20 from an edge of the tubular member 30.

FIG. 2 shows the holder 50 that is disposed on the end 31 of the tubular member 30 and the wire members 20 that are inserted through the holder 50. The state at the end 32 of the tubular member 30 is the same as that at the end 31 and thus will not be shown and described.

As shown in FIG. 2, when the holder 50 is inserted into the tubular member 30, the holder 50 is coupled to the end 31 of the tubular member 30. The holder 50 includes a first end 51 and a second end 52, which are located at opposite sides of the holder 50. The second end 52 of the holder 50 is inserted in an inner side of the tubular member 30. The holder 50 is coupled to the tubular member 30 so that a portion including the first end 51 is exposed from the tubular member 30.

The holder 50 is cylindrical. Two wire members 20 are inserted through the holder 50. As shown in FIG. 3, each wire member 20 includes a joint portion 27 that joins the first wire 21 and the second wire 24. The holder 50 covers the joint portion 27 of each wire member 20.

Figure 5:
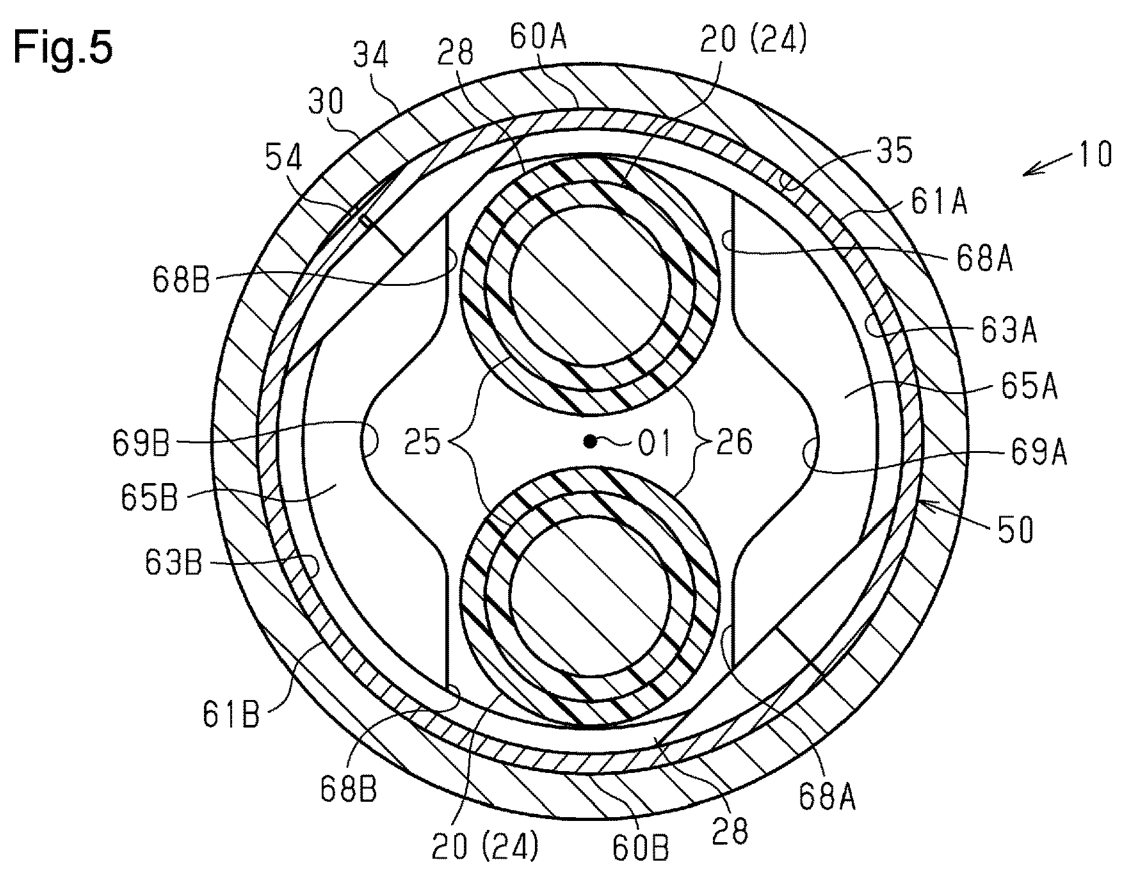
FIG. 5 is a cross-sectional view taken along line 5-5 in FIG. 3.
Figure 6:
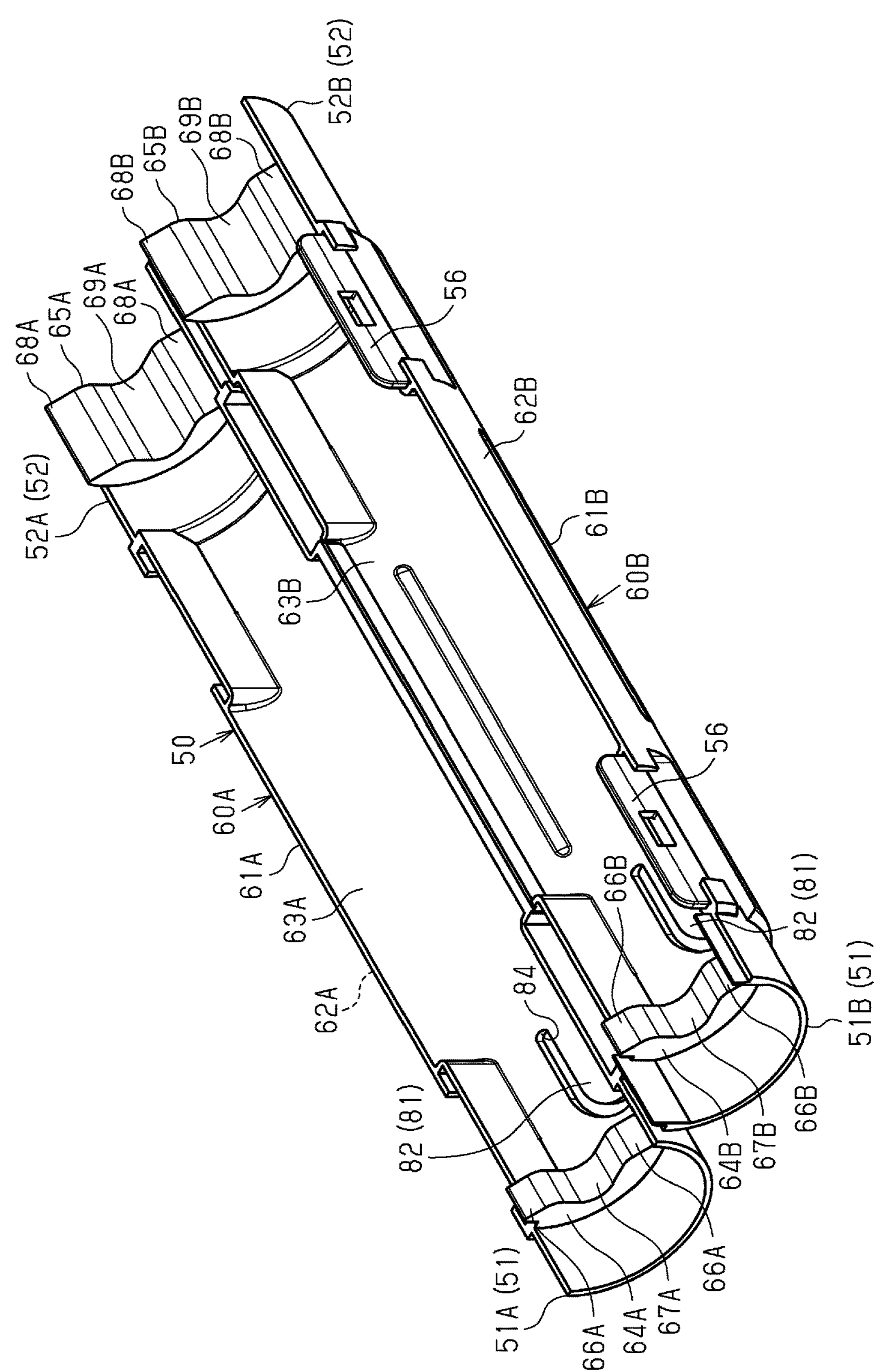
FIG. 6 is a schematic perspective view of a holder shown in FIG. 1.

As shown in FIGS. 4 to 6, the holder 50 includes a first segment 60A and a second segment 60B. The first segment 60A and the second segment 60B have a shape of the cylindrical holder 50 that is separated by a separation plane extending in the longitudinal direction of the holder 50. Thus, each of the first segment 60A and the second segment is semi-cylindrical. In the present embodiment, the separation plane extends through a center axis O1 of the tubular holder 50.

The holder 50 includes a hinge 54 that joins the first segment 60A and the second segment 60B. In an example, the holder 50 is a single-piece component in which the first segment 60A, the second segment 60B, and the hinge 54 are formed integrally. The hinge 54 is a thin plate. The first segment 60A and the second segment 60B are configured to pivot relative to each other about the hinge 54. The holder 50 is configured to pivot the first segment 60A relative to the second segment 60B to obtain the closed state shown in FIG. 2. Also, as shown in FIG. 6, the holder 50 is configured to obtain an open state in which the inner surfaces 63A and 63B of the first segment 60A and the second segment 60B are exposed. When the holder 50 changes the first segment 60A and the second segment 60B from the open state to the closed state, the holder 50 is coupled to the wire members 20 so as to cover the wire members 20 from an outer side.

As shown in FIGS. 2 and 6, the first segment 60A includes a first engagement portion 55 located at a side opposite to the hinge 54 in the circumferential direction. The second segment 60B includes a second engagement portion 56 located at a side opposite to the hinge 54 in the circumferential direction. The second engagement portion 56 is configured to engage the first engagement portion 55. When the first engagement portion 55 engages the second engagement portion 56, the first segment 60A the second segment maintain the tubular shape.

Each of the first segment 60A and the second segment 60B includes a lock portion 81. The lock portion 81 is arranged in accordance with the through hole 33 of the tubular member 30. The lock portion 81 includes a flexible piece 82 and a fixing projection 83. The flexible piece 82 extends toward the first end 51 in the longitudinal direction of the holder 50. Each of the first segment 60A and the second segment 60B includes a U-shaped slit 84. The flexible piece 82 is defined by a portion of the first segment 60A and the second segment 60B surrounded by the slit 84. The flexible piece 82 is flexible in a radial direction of the holder 50. The fixing projection 83 projects from the flexible piece 82 to an outer side of the holder 50. When the holder 50 is inserted into the tubular member 30, the fixing projection 83 is fitted into the through hole 33 of the tubular member 30. Thus, the lock portion 81 fixes the holder 50 to the tubular member 30.

As shown in FIGS. 4 to 6, the first segment 60A and the second segment 60B include bodies 61A and 61B, respectively. Each of the bodies 61A and 61B is semi-cylindrical. The bodies 61A and 61B respectively include outer surfaces 62A and 62B and the inner surfaces 63A and 63B.

The first segment 60A includes a first holding portion 64A and a second holding portion 65A. The second segment 60B includes a first holding portion 64B and a second holding portion 65B. The first holding portions 64A and 64B and the second holding portions 65A and 65B are arranged to hold the wire members 20 in the holder 50.

The first holding portions 64A and 64B are disposed on the first ends 51A and 51B of the first segment 60A and the second segment 60B. The second holding portions 65A and 65B are disposed on the second ends 52A and 52B of the first segment 60A and the second segment 60B. The first holding portion 64A and the second holding portion 65A of the first segment 60A project from the inner surface 63A of the body 61A of the first segment 60A. In the same manner, the first holding portion 64B and the second holding portion 65B of the second segment 60B project from the inner surface 63B of the body 61B of the second segment 60B.

As shown in FIG. 4, the first holding portions 64A and 64B are formed so a s to sandwich the circumferential surfaces of the two wire members 20 in the holder 50 from opposite sides. As viewed in a direction extending along the center axis O1 of the holder 50, the first holding portions 64A and 64B are disposed to sandwich the two wire members 20 in the holder 50 in a direction that is orthogonal to a direction (vertical direction in FIG. 4) in which the two wire members 20 are arranged next to one another. As shown in FIG. 3, each wire member 20 includes the first wire 21 and the second wire 24. As shown in FIG. 4, the first holding portions 64A and 64B are disposed to sandwich the circumferential surfaces of the two first wires 21 from opposite sides. Each of the first holding portions 64A and 64B includes two contact parts 66A and 66B configured to contact the two wire members 20 (first wire 21) and recesses 67A and 67B recessed toward a radially outer side of the holder 50 between the two contact parts 66A and 66B. The first holding portions 64A and 64B having the above structure are V-shaped.

As shown in FIG. 5, the second holding portions 65A and 65B are formed so as to sandwich the two wire members 20 in the holder 50. As viewed in a direction extending along the center axis O1 of the holder 50, the second holding portions 65A and 65B are disposed to sandwich the wire members 20 in the holder 50 in a direction orthogonal to the arrangement direction (vertical direction in FIG. 5) of the two wire members 20. As shown in FIG. 5, the second holding portions 65A and 65B are disposed to sandwich the circumferential surfaces of the two second wires 24 from opposite sides. Each of the second holding portions 65A and 65B includes two contact parts 68A and 68B configured to contact the two wire members 20 (second wire 24) and recesses 69A and 69B recessed toward a radially outer side of the holder 50 between the two contact parts 68A and 68B. The second holding portions 65A and 65B having the above structure are V-shaped.

Operation and Advantages

The operation and advantages of the wire harness 10 of the present embodiment will now be described.

(1) The wire harness 10 includes the tubular member 30, the wire members 20 inserted through the tubular member 30, and the tubular holders 50 holding the wire members 20 in the tubular member 30. Each holder 50 includes the first segment 60A and the second segment 60B, which are separated by the separation plane extending in the longitudinal direction of the holder 50. The first segment 60A includes the holding portions 64A and 65A that hold the wire members 20 in the holder 50. Also, the second segment 60B includes the holding portions 64B and 65B that hold the wire members 20 in the holder 50.

In the wire harness 10, the wire members 20 are sandwiched and held by the holding portion 64A of the first segment 60A and the holding portion 64B of the second segment 60B in the holder 50. Also, the wire members 20 are sandwiched and held by the holding portion 65A of the first segment 60A and the holding portion 65B of the second segment 60B in the holder 50. This restricts rotation of the wire members 20 in the holder 50. In addition, a jig for bundling the wire members 20 is not necessary. This simplifies the structure of the wire harness 10. Furthermore, the wire members 20 having different cross-sectional shapes are readily dealt with as compared to a case in which the jig for bundling the wire members 20 is adjusted. Thus, the holder 50 has a high versatility.

(2) The first holding portions 64A and 64B are disposed on the first ends 51A and 51B of the first segment 60A and the second segment 60B. The second holding portions 65A and 65B are disposed on the second ends 52A and 52B of the first segment 60A and the second segment 60B. The holding portions 64A, 64B, 65A, and 65B are disposed on the opposite ends 51A, 51B, 52A, and 52B of the first segment 60A and the second segment 60B. Thus, rotation of the wire members 20 is restricted at the opposite ends 51 and 52 in the longitudinal direction of the holder 50.

(3) The first segment 60A includes the semi-cylindrical body 61A and the holding portions 64A and 65A projecting from the inner surface 63A of the body 61A. The second segment 60B includes the semi-cylindrical body 61B and the holding portions 64B and 65B projecting from the inner surface 63B of the body 61B. The cylindrical holder 50 includes the first segment 60A and the second segment 60B. Thus, the wire members 20 are readily covered by the holder 50.

(4) As viewed in a direction extending along the center axis O1 of the holder 50, the holding portions 64A and 65A of the first segment 60A and the holding portions 64B and 65B of the second segment 60B are disposed to sandwich the two wire members 20 in a direction orthogonal to the direction in which the two wire members 20 are arranged next to one another. This restricts rotation of each of the two wire members 20.

(5) The holder 50 includes the hinge 54 joining the first segment 60A and the second segment 60B. The first segment 60A and the second segment 60B change from the open state to the closed state about the hinge 54. Thus, the wire members 20 are readily disposed in the holders 50.

(6) The wire member 20 includes the first wire 21, the second wire 24, and the joint portion 27 joining the first wire 21 and the second wire 24. Thus, the holder 50 stably holds the first wire 21, the second wire 24, and the joint portion 27 of the wire member 20. This appropriately restricts movement of the joint portion 27 in the holder 50. Thus, the joined state of the first wire 21 and the second wire 24 is appropriately maintained.

(7) The circumference of the joint portion 27 is covered by the covering member 28. The holder 50 is formed to cover the joint portion 27. Thus, the holder 50, which is inserted into the tubular member 30, hinders contact of the tubular member 30 with the covering member 28, which covers the joint portion 27. If the covering member 28 contacts the tubular member 30, the covering member 28 may wear due to vibration or the like. In the present embodiment, the holder 50 covers the joint portion 27 and the covering member 28, which covers the joint portion 27. This limits the wearing of the covering member 28. Thus, the durability of the covering member 28 is improved, Accordingly, the durability of the wire member 20 is improved.

Modified Examples

The embodiment described above may be modified as follows. The embodiment and the following modified examples can be combined as long as the combined modified examples remain technically consistent with each other.

Figure 7:
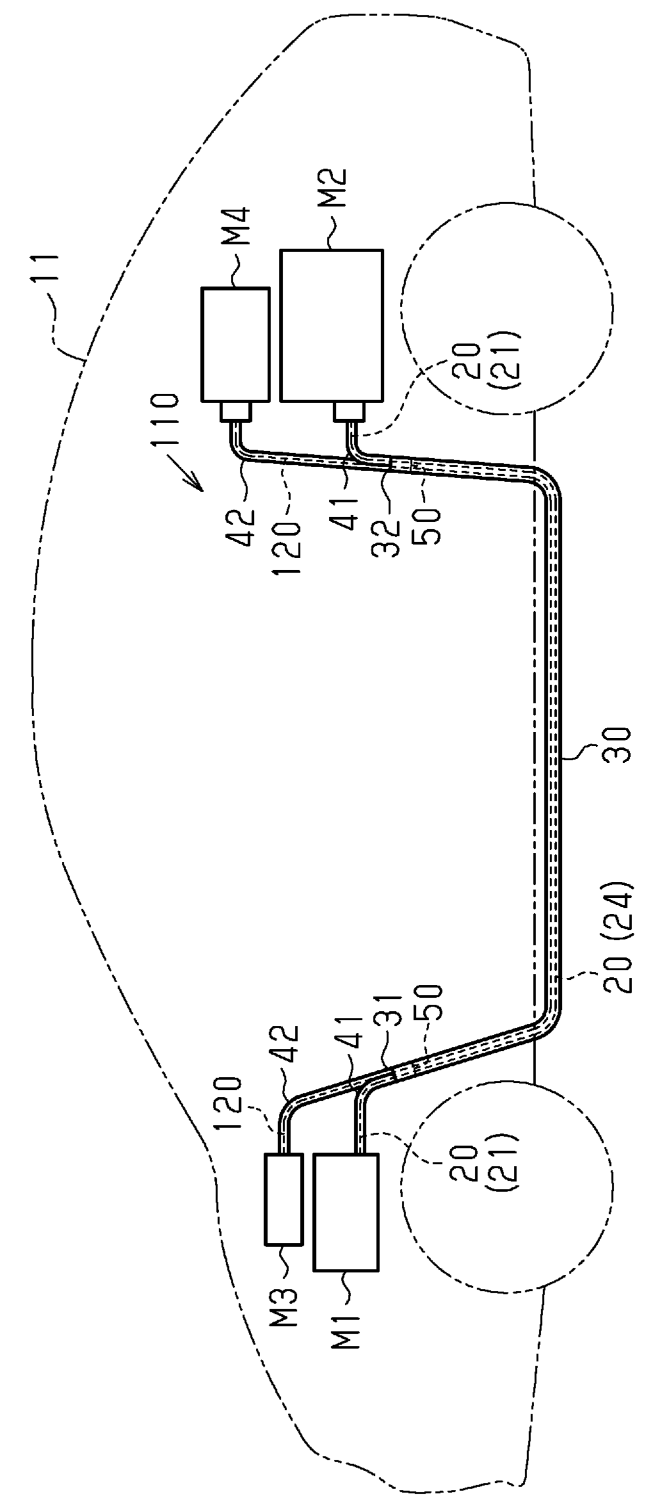
FIG. 7 is a schematic diagram showing a wire harness in a modified example.

As shown in FIG. 7, a wire harness 110 may be configured to electrically connect electric devices M1, M2, M3, and M4. In an example, the wire harness 110 is mounted on a vehicle 11 such as a hybrid vehicle, an electric vehicle, or the like. The wire harness 110 includes the wire members 20 and one or more (in this modified example, two) wire members 120 that electrically connects the electric device M3 and the electric device M4. The wire members 120 and the wire members 20 are inserted through the tubular member 30 and the holders 50. In an example, the wire harness 110 includes a tubular exterior member 42 surrounding the wire members 120 that are drawn out of the tubular member 30. The tubular member 30 and the exterior members 41 and 42 protect the wire members 20 and 120, accommodated in the tubular member 30 and the exterior members 41 and 42, from flying objects and waterdrops.

Figure 8:
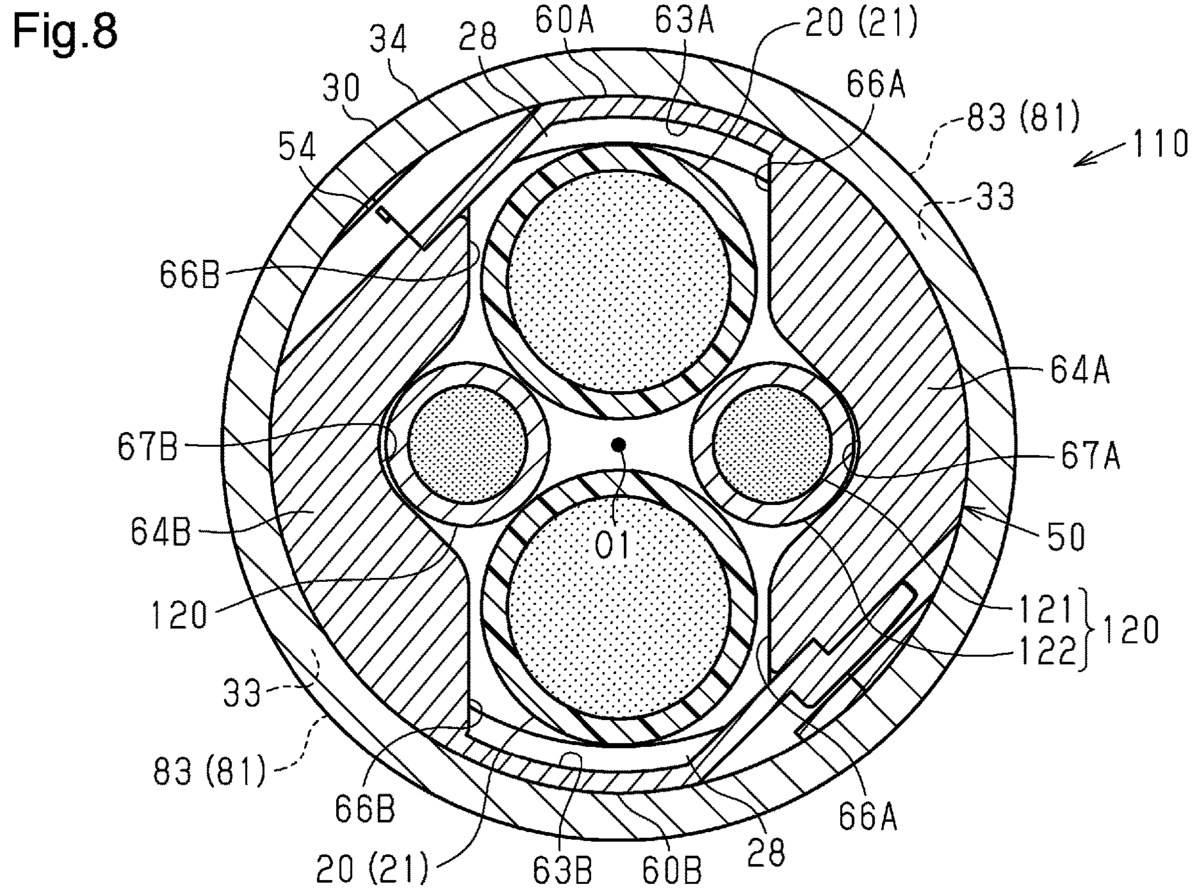
FIG. 8 is a cross-sectional view of the wire harness shown in FIG. 7.

As shown in FIG. 8, the wire member 120 is a flexible wire. In an example, the wire member 120 is a low-voltage wire. The wire member 120 may be, for example, a shielded wire having an electromagnetic shielding structure or an unshielded wire that does not have an electromagnetic shielding structure. In this modified example, the wire member 120 is an unshielded wire. In the same manner as the first wire 21 of the above embodiment, the wire member 120 is more flexible than the rigid wire. In an example, the wire member 120 has a higher bendability than the rigid wire. The wire member 120 includes a core wire 121 formed of metal strands and an insulation covering 122 that covers the circumference of the core wire 121. The core wire 121 may be, for example, a stranded wire or a braided member. The core wire 121 is a stranded wire. The material of the core wire 121 may be, for example, copper-based or aluminum-based metal. The core wire 121 may have any transverse cross-sectional shape. The transverse cross-sectional shape of the core wire 121 is a circle.

As shown in FIG. 8, the wire members 120 may be disposed in the recesses 67A and 67B of the first holding portions 64A and 64B in the holder 50. Thus, the holder 50 restricts rotation of the wire members 120 together with the wire members 20. In addition, the holder 50 protects the wire members 120 together with the wire members 20 from the edge of the end of the tubular member 30. As shown in FIG. 5, the holder 50 includes the recesses 69A and 69B in the second holding portions 65A and 65B. The wire members 120 are disposed in the recesses 69A and 69B. Thus, the second holding portions 65A and of the holder 50 restrict rotation of the wire members 120.

The recesses 67A and 67B may be omitted from the first holding portions 64A and 64B. The recesses 69A and 69B may be omitted from the second holding portions 65A and 65B.

In the embodiment, the holders 50 are disposed on the longitudinal ends 31 and 32 of the tubular member 30. However, there is no limitation to such a structure. In an example, the holder 50 may be disposed on only one of the longitudinal ends of the tubular member 30.

In the embodiment, the joint portions 27 are disposed at different positions, in the longitudinal direction, of the wire members 20. However, there is no limitation to such a structure. In an example, the joint portions 27 may be disposed at the same position, in the longitudinal direction, of the wire members 20.

In the embodiment, the number of the wire members 20 and 120 inserted through the holders 50 is not particularly limited. The number of the wire members 20 and 120 may be changed in accordance with the specifications of the vehicle 11. The number of the wire members 20 may be, for example, one or three or more. The number of the wire members 120 may be, for example, one or three or more.

The tubular member 30 of the embodiment is not limited to a member formed of a single material, that is, metal or resin. In an example, the tubular member 30 may be a combined member obtained by laminating or embedding a conductive shield layer in a nonmetal pipe body.

In the embodiment, an exterior member having a branching passage may be disposed between the tubular member 30 and the exterior member 41. Such an exterior member may be, for example, a waterproof rubber cover.

Although not particularly described in the embodiment, an electromagnetic shield member may be disposed in the tubular member 30. The electromagnetic shield member is disposed, for example, to surround the wire members 20 as a bundle. In an example, the electromagnetic shield member is disposed between the inner circumferential surface of the tubular member 30 and the outer circumferential surface of the wire member 20. The electromagnetic shield member may be, for example, a flexible braided wire or a metal foil.

The positional relationship of the electric devices M1 and M2 (M1 to M4) in the vehicle 11 is not limited to that of the embodiment and may be changed in accordance with the configuration of the vehicle.

In the embodiment, a portion of the holder 50 including the first end 51 projects from the tubular member 30 and may form a projection portion. Tape may be wrapped around the projection portion of the holder 50 and the wire members 20 so that the wire members 20 are fixed to the holder 50.

As shown in FIGS. 2, 4 and 5, when the first segment 60A and the second segment 60B are in the closed state, the holder 50 may be cylindrical in which a circumferential wall of the first segment 60A and a circumferential wall of the second segment 60B are joined together to form a cylindrical circumference that extends continuously around an entire circumference of the holder 50.

Each of the holding portions 64A, 64B, 65A, and 65B may be referred to as a radially inward projection of the holder 50, which projects inwardly in the radial direction and directed toward the center axis O1 of the holder 50 as shown in a cross-sectional view of the holder 50. As shown in FIG. 4, when viewed from a direction along the center axis O1 of the holder 50, a radially inner contour of the first holding portion 64A includes two planar parts, each defining or serving as the contact part 66A and each extending parallel to the radial direction of the holder 50, and a concave part located between and continuous with the two planar parts (i.e., the two contact parts 66A) of the radially inward projection and defining or serving as the recess 67A. As shown in FIGS. 4 and 5, the radially inward contour of the first holding portion 64B, the radially inward contour of the second holding portion 65A, and the radially inward contour of the second holding portion 65B may have the same shape as the radially inward contour of the first holding portion 64A.

As shown in FIGS. 3 and 4, the first holding portion 64A and the first holding portion 64B may be arranged in the same position in the longitudinal direction of the holder 50. When the first segment 60A and the second segment 60B are in the closed state, the two planar parts of the contact part 66A and the two planar parts of the contact part 66B may face and be parallel to each other. As shown in FIGS. 3 and 5, the second holding portion 65A and the second holding portion 65B may be arranged in the same manner as the first holding portion 64A and the first holding portion 64B.

As shown in FIG. 4, when the first segment 60A and the second segment 60B are in the closed state, the distance between the contact part 66A of the first holding portion 64A and the contact part 66B of the first holding portion 64B may be smaller than the outer diameter of the wire member 20.

All aspects of the embodiments in the present disclosure should be considered to be illustrative and non-restrictive. The present disclosure is not limited to those exemplified and is shown by the scope of the claims. It is intended to include all modifications within the meaning and range equivalent to the scope of the claims.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

REFERENCE SIGN LIST

10) wire harness
11) vehicle
20) wire member
21) first wire
22) core wire
23) insulation covering
24) second wire
25) single core wire
26) insulation covering
27) joint portion
28) covering member
30) tubular member
31) first end
32) second end
33) through hole
34) outer surface
35) inner surface
41) exterior member
42) exterior member
50) holder
51) first end
52) second end
51A) first end
51B) first end
52A) second end
52B) second end
54) hinge
55) first engagement portion
56) second engagement portion
60A) first segment
60B) second segment
61A) body
61B) body
62A) outer surface
62B) outer surface
63A) inner surface
63B) inner surface
64A) first holding portion
64B) first holding portion
65A) second holding portion
65B) second holding portion
66A) contact part
66B) contact part
67A) recess
67B) recess
68A) contact part
68B) contact part
69A) recess
69B) recess
81) lock portion
82) flexible piece
83) fixing projection
84) slit
110) wire harness
120) wire member
121) core wire
122) insulation covering
M1 to M4) electric device
O1) center axis

What is claimed is:

1. A wire harness, comprising:

a tubular member including opened axial ends;

wire members extending through the tubular member, each of the wire members has a circular cross-sectional shape; and a tubular holder inserted and coupled to one of the opened axial ends of the tubular member to hold the wire members in the tubular member, wherein the holder includes a first segment and a second segment that are separated by a separation plane that extends in a longitudinal direction of the holder, each of the first segment and the second segment includes a radially-inward surface and a holding portion, which is a radially inward projection projecting from the radially-inward surface of the corresponding one of the first and second segments to directly contact an outer surface of each of the wire members disposed in the holder or to directly face the outer surface of each of the wire members with a minute gap, when viewed from a direction along a center axis of the holder, a radially inner contour of the holding portion of the first segment includes a pair of first planar parts, each of the first planar parts extending parallel to a radial direction of the holder, and a radially inner contour of the holding portion of the second segment includes a pair of second planar parts, each of the second planar parts extending parallel to the radial direction of the holder, one of the first planar parts and one of the second planar parts face and are parallel to each other, and are disposed to sandwich a first one of the wire members in a direction orthogonal to a direction in which the wire members are arranged next to one another, the other of the first planar parts and the other of the second planar parts face and are parallel to each other, and are disposed to sandwich a second one of the wire members in a direction orthogonal to a direction in which the wire members are arranged next to one another, and the first and second ones of the wire members that are sandwiched between the first and second planar parts are radially arranged between and sandwiched between the radially-inward surfaces of the first segment and the second segment.

2. The wire harness according to claim 1, wherein each of the first segment and the second segment includes two ends in the longitudinal direction of the holder, and in each of the first segment and the second segment, the holding portion is disposed on each of the two ends.

3. The wire harness according to claim 1, wherein the holder is cylindrical, and each of the first segment and the second segment includes a semi-cylindrical body and the holding portion projecting from an inner surface of the semi-cylindrical body.

4. The wire harness according to claim 1, wherein each of the wire members includes a first wire, a second wire, and a joint portion joining the first wire and the second wire, and the joint portion is disposed in the holder.

* * * * *